US011161765B2

(12) United States Patent
Tijerina Ramos

(10) Patent No.: US 11,161,765 B2
(45) Date of Patent: Nov. 2, 2021

(54) METHOD AND MECHANISM FOR OPENING AND CLOSING MOULDS FOR A MACHINE FOR FORMING GLASS ITEMS

(71) Applicant: Vitro, S.A.B. de C.V., San Pedro Garza Garcia (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 502 days.

(21) Appl. No.: 16/083,159

(22) PCT Filed: Mar. 10, 2016

(86) PCT No.: PCT/MX2016/000025
§ 371 (c)(1),
(2) Date: Sep. 7, 2018

(87) PCT Pub. No.: WO2017/155380
PCT Pub. Date: Sep. 14, 2017

(65) Prior Publication Data
US 2019/0092671 A1    Mar. 28, 2019

(51) Int. Cl.
*C03B 9/353*    (2006.01)
(52) U.S. Cl.
CPC ............ *C03B 9/3537* (2013.01); *C03B 9/353* (2013.01); *C03B 9/3532* (2013.01)
(58) Field of Classification Search
CPC ................................ C03B 9/352; C03B 9/353
See application file for complete search history.

(56) References Cited

U.S. PATENT DOCUMENTS 1,911,119 A    5/1933  Ingle
3,472,639 A    10/1969  Mumford
(Continued)

FOREIGN PATENT DOCUMENTS

CN    1765785 A    5/2006
EP    3392213 A1    10/2018
(Continued)

*Primary Examiner* — John M Hoffmann
(74) *Attorney, Agent, or Firm* — The Webb Law Firm

(57) ABSTRACT

A mold opening and closing mechanism for a machine for forming glass articles includes at least one mold divided into two halves that open and close to form the articles. The halves of the molds are coupled to a pair of supporting arms, each arm being independently mounted opposite the other and separated in a parallel manner with respect to a support structure. The mechanism includes mold synchronizing means mounted so as to move with the mold support arms and to move inwards or outwards to open and close the molds. The mechanism further includes lever means having a first end connected to the support structure, the lever means and the pair of support arms transmitting to the synchronizing means an articulated inward or outward movement to close or open the molds. The mechanism also includes: drive means coupled to the support structure, for imparting an opening and closing movement to the support arms; a double-linkage closing system connected in an articulated manner to the synchronizing means; and a second end connected to the support structure. The lever means and the pair of support arms transmit an articulated inward or outward movement to the synchronizing means to close or open the molds. The mechanism further includes drive means coupled to the support structure to impart an opening and closing movement to the support arms, and a double-linkage closing system connected in an articulated and independent manner to each of the support arms and to the drive means.

11 Claims, 5 Drawing Sheets

(56) References Cited

U.S. PATENT DOCUMENTS

| | | | |
|---|---|---|---|
| 4,101,306 A | 7/1978 | Schaar | |
| 4,448,600 A | 5/1984 | Braithwaite et al. | |
| 4,449,996 A | 5/1984 | Irwin et al. | |
| 4,655,813 A | 4/1987 | Nebelung | |
| 6,442,976 B1 | 9/2002 | Flynn | |
| 6,684,665 B1* | 2/2004 | Bogert | C03B 9/165 65/360 |
| 7,845,193 B2 | 12/2010 | Cramer | |
| 8,113,016 B2 | 4/2012 | Balbi et al. | |
| 2008/0209951 A1* | 9/2008 | Armando | C03B 9/353 65/359 |
| 2011/0314872 A1 | 12/2011 | Armando et al. | |

FOREIGN PATENT DOCUMENTS

| | | |
|---|---|---|
| JP | 2001019443 | 1/2001 |
| RU | 2184090 C2 | 6/2002 |
| RU | 2463260 C2 | 10/2012 |
| SU | 86892 | 3/1949 |
| SU | 856374 | 3/1977 |
| SU | 947096 | 3/1979 |
| WO | 2015175971 A1 | 11/2015 |

\* cited by examiner

METHOD AND MECHANISM FOR OPENING AND CLOSING MOULDS FOR A MACHINE FOR FORMING GLASS ITEMS

FIELD OF INVENTION

This invention refers to a glassware forming machines and, more specifically, to a mold opening and closing method and mechanism for this type of machine.

BACKGROUND OF THE INVENTION

Glassware such as narrow neck glass containers are usually produced in glassware forming machines such as those which can include multiple similar individual forming sections by the blow-blow process, while wide-mouth jars, glasses and other glass articles produced in forming machines known as Series "E" and "F" by the press-blow process, in so-called "hot mold".

One of the first single-section glass container forming machines is described in U.S. Pat. No. 1,911,119, which includes a parison or preform forming station and a final forming or blowing station of the article. Each of the stations is mounted on an individual structure. Thus, during the manufacturing process of the containers by means of the blow-blow-blow or press-blow process, the glass in the form of gob is introduced into a parison or preformed mold in the parison forming station, where, depending on the process, the gob is settled by means of a blowing or vacuum process to the lower part of the parison mold to form the crown of the container. Then, once the crown of the container is formed, a counter-blow is made to form a parison or preform of the container. Subsequently, the container preform is transferred by an inversion mechanism with a 180 degree movement of the parison mold to a final blow mold of the forming station or final blow mold, where final shape is given to the container. Finally, the newly formed container is transferred by a pusher mechanism to a dead plate at the front of the machine and then transferred by means of a conveyor belt to a tempering furnace.

Both for the formation of the parison and final blowing of glass articles, the parison or preform forming station and the final forming or blowing station of the article, include a series of opposite mold halves. These mold halves are held in place by a mold opening/closing mechanism, which moves between opening and closing positions, to open and close the halves of the parison or final blow mold during the glassware forming process.

Generally, an open-close mechanism, such as the one shown in U.S. Pat. No. 1,911,119, consists of two air cylinders; levers and links, connected to each other by movable and fixed bolts.

The cylinders have double rods to absorb the lateral thrust on the piston, preventing the cylinders from becoming oval and ensuring less wear on the caps.

The linkage consists of a crank mounted on a central post and links that transform the straight-line movement of the piston into a rotating movement of the two cranks, which has a grooved inner cavity. The cranks with internal grooves receive the grooved shafts which, by means of the levers and bolts placed at the upper end of the cranks, connect the hinges and, working together with the hinge support, they open and close the molding and, at the same time, multiply the force provided by the cylinder to obtain the required closing force.

The open molding action is cushioned out by a combination of a check valve and exhaust holes in the air cylinder, which serve to cut off the exhaust air near the end of the piston stroke. A needle valve located on the back of the frame above a valve block, controls the exhaust air to regulate the cushioning of the cylinder.

The mold is closed by the regulate air pressure of a manifold through a spool valve, which is operated from the valve block. When the valve block cuts the pilot air, the spring loaded spool valve directs the manifold air to the opposite side of the cylinder to open the mold.

The mold opening mechanism has evolved with the new forming machines, for example, the U.S. Pat. No. 4,448,600, by David Braithwaite et al, relates to a mechanism for opening and closing three molds simultaneously, where a cylinder-piston assembly is connected to the mold parts through a links or joints system which serves to equalize the closing pressure of the three molds. The link system comprises a link connected centrally to the cylinder-piston assembly which equalizes the pressure between one mold and a further link and a further link equalizes the pressure between the other two molds.

Another type of mold opening and closing mechanism is shown in U.S. Pat. No. 8,113,016 assigned to Mario Balbi, et al, which has a mold divided into two halves that move between a closed forming position and an open extraction position by an open-closing mechanism. The mold includes two handling arms, each connected to a respective half-mold, which are rotated about respective fixed hinge axes by a single linear actuator. The mobile member translates in a direction parallel to the fixed hinge axes, and is connected to the handling arms by mechanical transmission having a respective guide and slide assembly for each handling arm.

However, one of the main problems with the opening mechanisms is that during the formation of the preform or parison, enough force is required to keep the molds closed. That is, once the molds are in closed position, is important for the opening/closing mechanism to resist the hydraulic pressure exerted by the glass during its formation in the mold, either by the press-blow or blow-blow process. For example, a plunger at a 10 or 12 pounds pressure will generate an internal pressure of about 145 to 150 pounds per square inch in the glass. If this is multiplied by several cavities and since the pressure is in all directions, a mold opening and closing mechanism will have to withstand an approximate pressure of about 1500 pounds per square inch per each mold half. Then, one of the main functions of the opening-closing mechanism is to keep the molds completely closed to avoid starting lines on the container or not leaving marks on the final article.

According to technical data, it has been determined that each half of each mold receives a pressure of approximately 1250 pounds force, that is, in a four-cavity machine, each arm of the open and close mechanism would be receiving about 5000 pounds of force per arm (left and right). Therefore, many of the mechanism's links are subject to considerable stress, which causes them to fatigue and fracture, requiring machine section shutdowns to replace damaged parts.

Another disadvantage of the known opening and closing mechanisms is their high level of complexity, which prevents any kind of cooling from being adapted to the molds.

An additional disadvantage is that, due to the number of components, the opening/closing mechanisms are too heavy, so a greater force is required on the motors to perform their opening/closing movement of the molds.

OBJECTIVES OF THE INVENTION

Therefore, one of the objectives of the present invention is to provide a mold opening and closing mechanism, which seeks to close the mold with minimum force, i.e., reduce the closing force to approximately 2000 pounds. It is proposed that the maximum force (approximately 5000 pounds) be only exerted when the piston is in operation, that is, around 1 second or 0.7 seconds, which would reduce the fatigue of the links or wear of the mechanisms.

This above is achieved by a double toggle arrangement (linkage) in the opening and closing mechanism of this invention, which allows maintaining the blocking of the molds during closing and reduces the closing force by approximately 2000 pounds. That is, the double toggle system allows, with a first movement, to immobilize the opening and closing mechanism in the closed position of the molds and, with a second movement, to unlock or release the mechanism to open the molds.

One of the additional advantages of this invention, is that mold holder arms move separately, that is, each arm or clamp has its own motor, so each one is synchronized in its opening and closing. By means of this type of arrangement, the left arm or mold holder can be moved first, positioning it to a virtual or theoretical zero, simulating a kind of wall or stop. Subsequently, the right arm or mold holder will reach the closing position, with a phase shift of one or two hundredths of a second. This type of offset is feasible through the definition of a motion profile for each arm with different accelerations and speeds. During the opening motion is important that both halves are opened at the same time, in order for the vacuum or capillarity forces to take off.

A further advantage is to manufacture a lighter mechanism of this invention, where the arms, when placed in a cantilever position and separated from each other, allow the opening and closing of the arms with a semi-parallel movement.

Another advantage of the present invention is that the opening/closing mechanism is completely modular, that is, to maintain, repair or change, the entire mechanism is removed from the machine section.

Finally, a further advantage of the present invention is that the jaws or arms are manufactured with the same design, so they can be placed either on the left or on the right side. Being standard, in case a quadruple to triple cavity change is required, only one set of inserts are changed. These inserts being self-balancing or self-compensating to transmit the same closing force in all molds.

These and other objectives and advantages of this invention will become apparent to those having ordinary skill in the field, from the following description of a specific and preferred embodiment of the invention, provided in combination with the accompanying drawings.

DETAILED DESCRIPTION OF THE INVENTION

Following is a description of the mold opening and closing mechanism of the present invention, which may be used either for the parison or preform side, or for the final blow mold.

Figure 1:
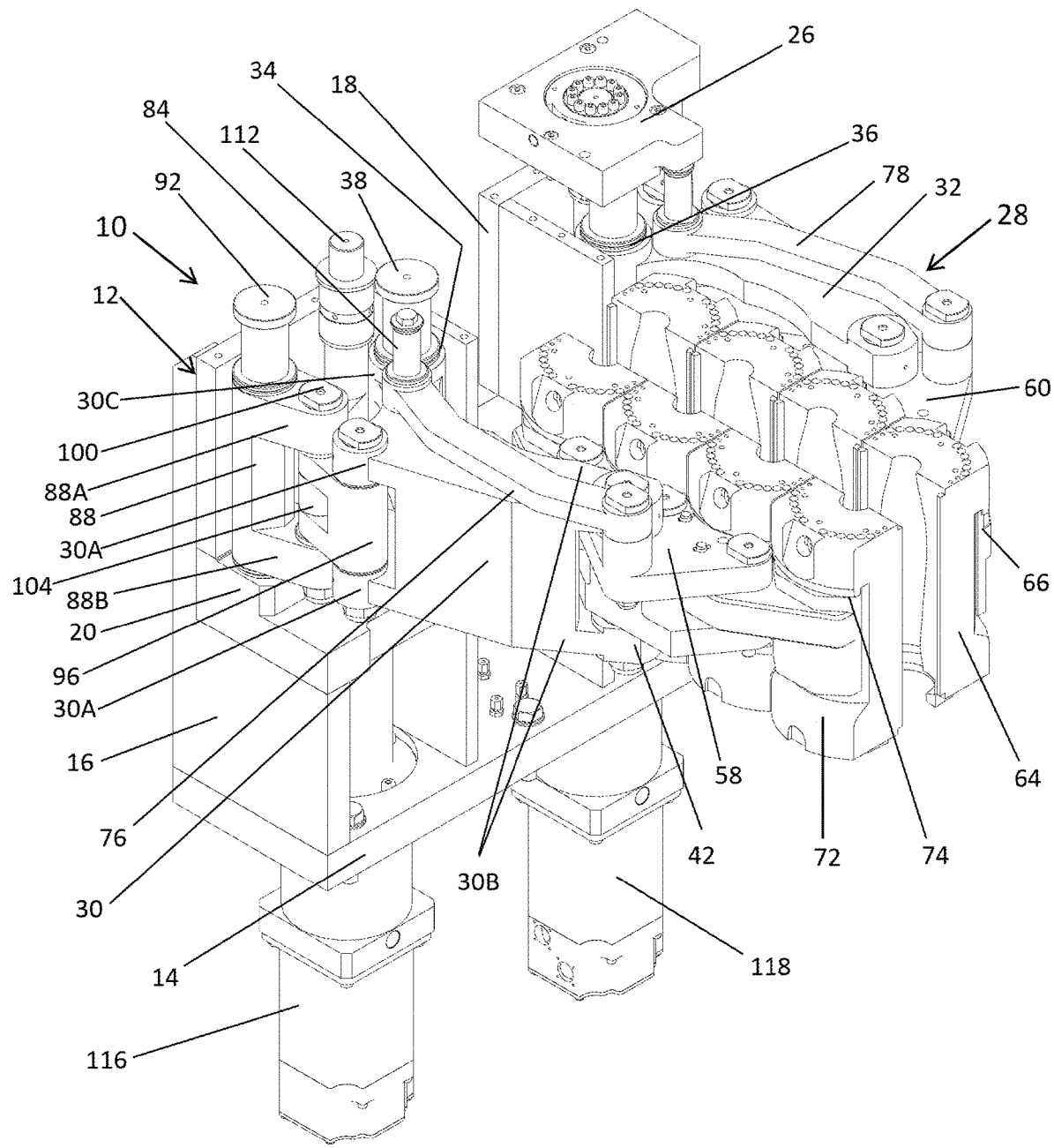
FIG. 1 is a perspective view of a preferred embodiment of the mold opening and closing mechanism for a glassware forming machine.
Figure 5:
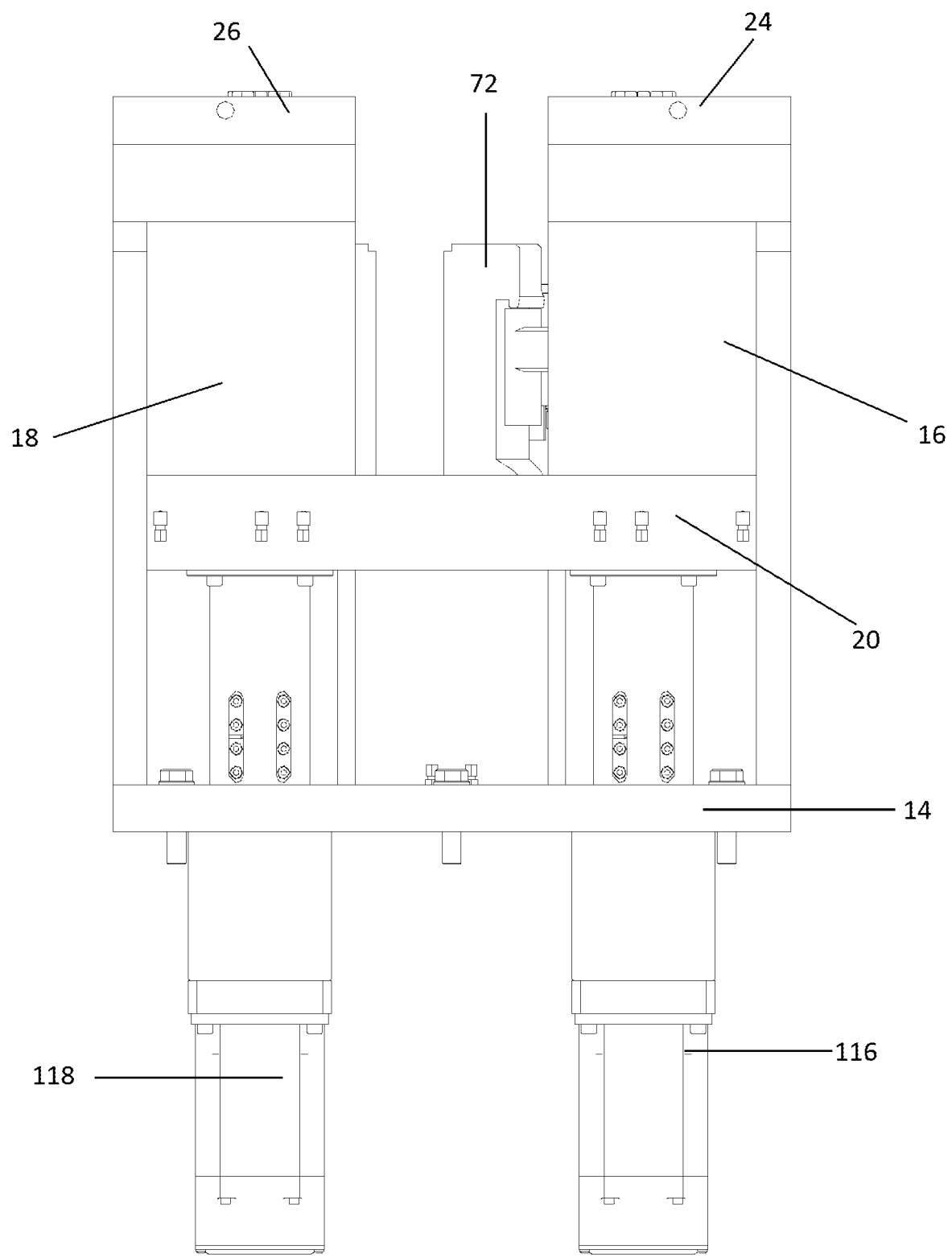

The mold opening and closing mechanism 10, as shown in FIGS. 1 through 5, comprises:

a support structure 12 including a support base 14 and two vertical support structures 16, 18. Each of the support structures 16, 18, include: an intermediate support base 20, 22 and an upper cover 24, 26 (FIGS. 1 and 5). The vertical support structures 16, 18, being placed parallel and located facing each other on the support base 14.

A mold support mechanism 28 comprising two mold support arms 30, 32 placed opposite one another. Each mold support arm 30, 32 containing double ends 30A, 30B, 30C, having a first pivot point 34, 36, at one first end for movement around a first vertical stationary shaft 38, 40, located in the vertical support structure 16, 18. Such first vertical stationary shaft 38, 40, being placed between the intermediate support base 20, 22, and the top cover 24, 26.

The mold support arms 30, 32, include a second pivot point 42, 44 at an opposite point, for movement around a second vertical shaft 46, 48. And, a third pivot point 50, 52, for movement around a third pivot shaft 54, 56. The first pivot point 34, 36; the second pivot point 42, 44; and the third pivot point 50, 52, of the mold support arms 30, 32, are located at the vertices of a triangular configuration of the arms 30, 32. The support arms 30, 32, are placed in cantilever position, independent of one another, which allows the opening and closing of the arms 30, 32, with a curvilinear translation movement.

A synchronization beam 58, 60, mounted with each of the mold support arms 30, 32, through the second vertical shaft 46, 48. The synchronization beam 58, 60, having a pivoting movement so that the synchronization beam can move with respect to the second vertical shaft 46, 48, generating an inward or outward movement; and, self-balancing or self-compensating mold holders including a first single mold holder 62, mounted by means of vertical shafts 63 on the synchronization beam 60.

Figure 2:
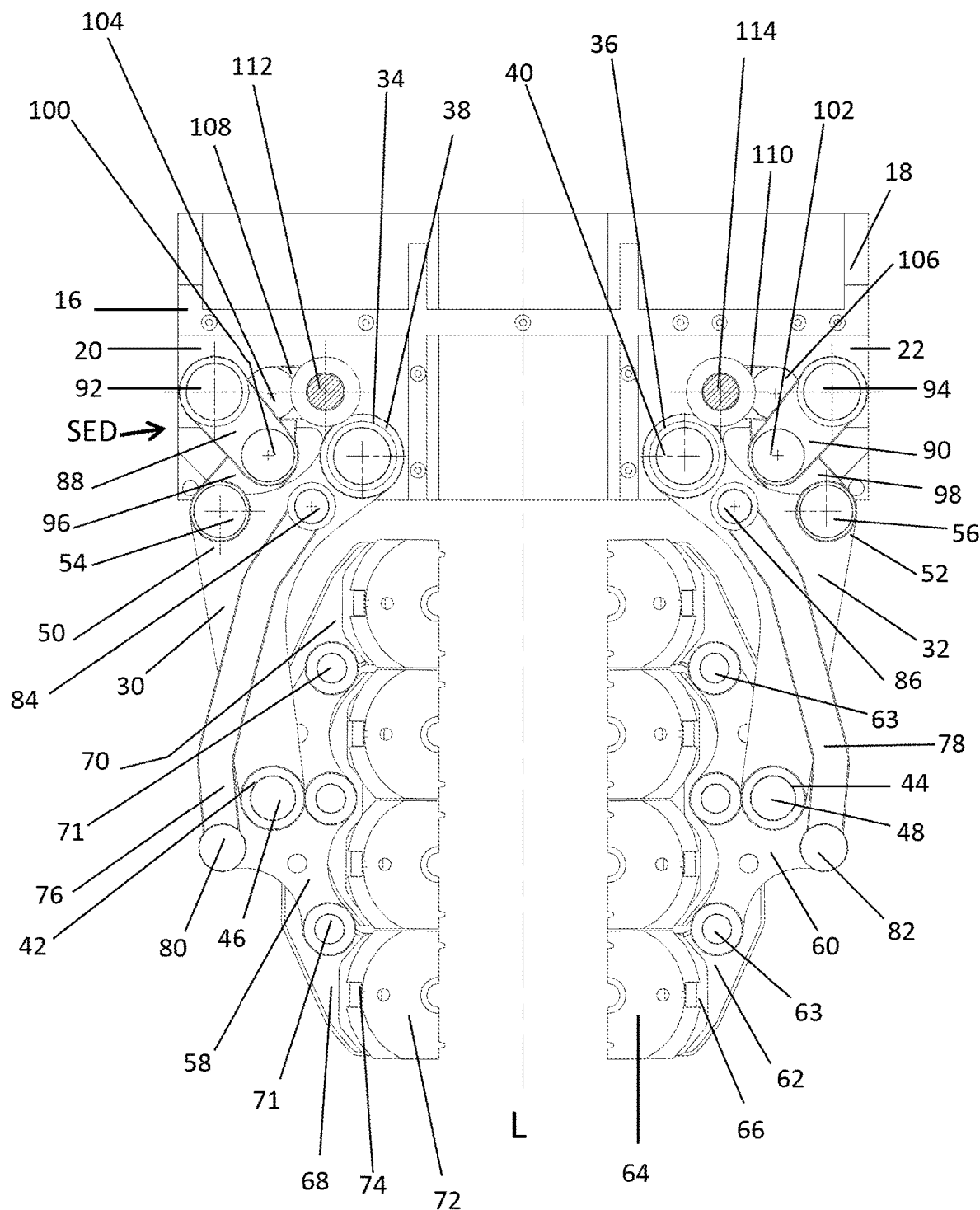
FIG. 2, is a top plan view, showing the mold opening and closing mechanism, in its open position; and, FIG. 3, is a top plan view, showing the mold opening closing mechanism, in its closed position.

The first single mold holder 62 holds several halves of a parison or blow mold 64 (FIG. 2 shows four cavities) by means of its retaining flanges 66; and, a dual mold holder 68, 70, mounted by means of vertical shafts 71 in the synchronization beam 58, in which four mold halves 72 are also mounted by means of their retention tabs 74, so that each of the mold halves 64, 72, are uniformly closed with a similar closing force.

The self-balancing or self-compensating mold holders have different arrangements depending on the number of cavities and can be single mold holders with dual mold holders; for example, for a triple cavity, an arrangement of a single mold holder facing one dual mold holder, so that the other single mold holder will be oriented against the dual mold holder. Such mold-holders are self-balancing or self-compensating, to transmit the same closing force in all molds.

A connecting rod 76, 78, positioned above the support arms of molds 30, 32, and connected at one of its ends to the outside of the synchronization beam 58, 60, by means of a vertical shaft 80, 82, to transmit a pantographic movement to the synchronization beam 58, 60, for closing or opening the molds. The opposite end of the connecting rod 76, 78, is coupled to the lower part of the upper cover 24, 26, by means of a holding bolt 84, 86, so that said connecting rod 76, 78, has a fixed pivot point on the upper cover 24, 26.

A double linkage system SED, which allows, with a first movement, to lock and immobilize the opening closing mechanism 10, in the closed position of the support arms and mold halves, reducing the closing effort of the molds during the glass article forming step and, with a second movement, unlocking or releasing the double linkage mechanism SED for the opening of each of the support arms and mold halves 64, 72.

Figure 4:
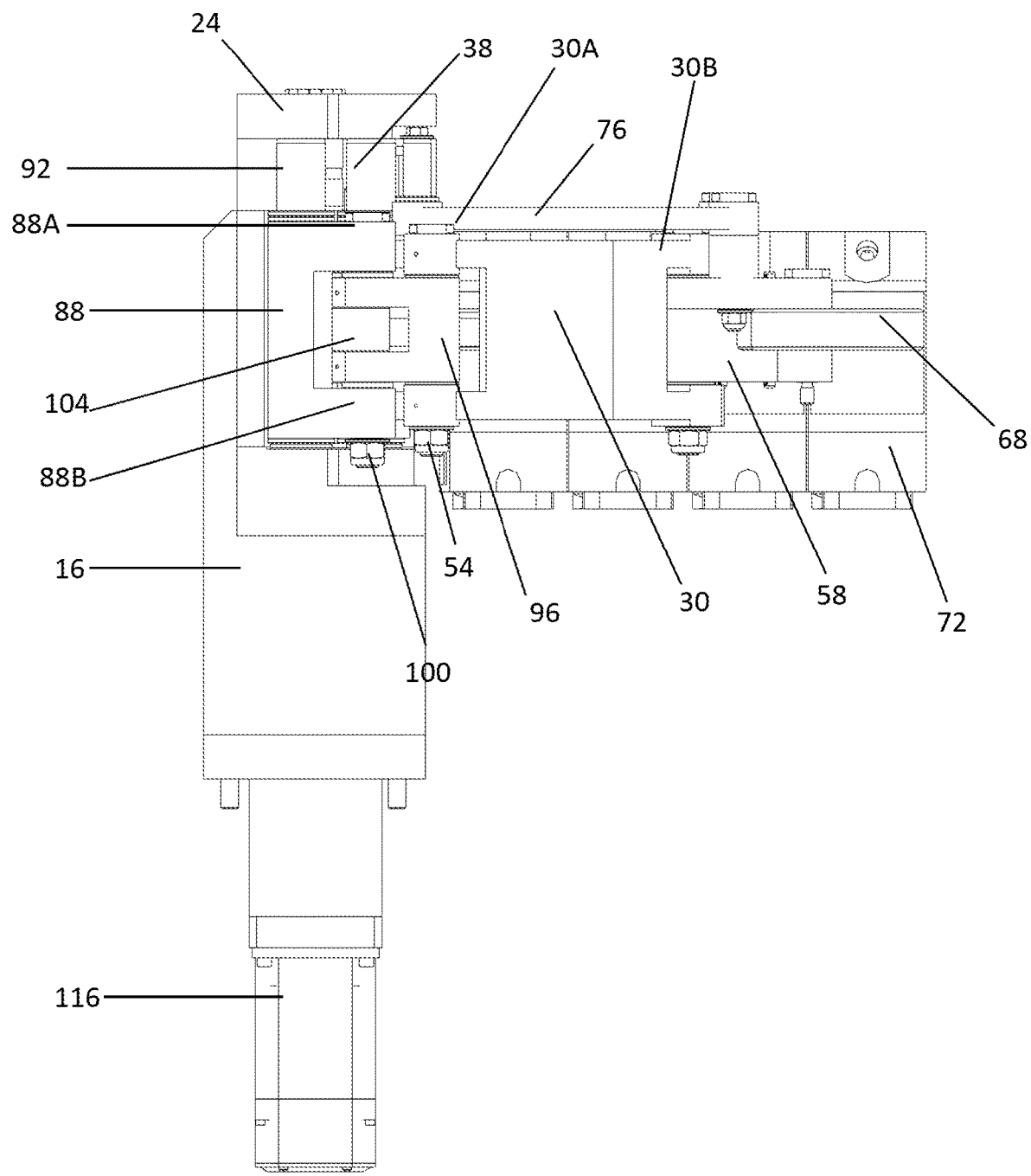
FIG. 4, is a side view of the mold opening closing mechanism for a glass forming machine; and, FIG. 5, is a rear view of the mold opening closing mechanism for a glassware forming machine.

The double linkage system SED comprising:

an articulated or "first" free link 88, 90, double arm 88A, 88B (only arm 88 is illustrated in FIGS. 1 and 4), which is connected at a first end by means of a vertical stationary shaft 92, 94, placed between the intermediate support base 20, 22, and the top cover 24, 26, so that the articulated free link 88, 90, can rotate at a fixed pivot point; and, a second end to rotate freely to the right or left side. The articulated free link 88, 90, double-arm 88A, 88B, being located near the lateral periphery of the vertical support structure 16, 18;

a primary or "second" link 96, 98, connecting one of its ends of each mold support arm 30, 32, at the third pivot point 50, 52, for movement around the third pivot shaft 54, 56 and, at its opposite end, at the articulated free link 88, 90, by means of a vertical shaft 100, 102, to have a pivoting movement to the left or to the right. The connection between the primary link 96, 98, and the articulated free link 88, 90, enable a first closing linkage action.

A secondary or "third" link 104, 106, (FIGS. 2 and 3) connecting articulately by a first end with the primary link 96, 98, and the articulated free link 88, 90, through the vertical shaft 100, 102, to have a pivoting movement to the left or to the right.

An interconnection crank 108, 110, said interconnection crank 108, 110 being coupled at the upper part of output shafts 112, 114, of drive means, such as a programmable motor 116, 118, to transmit a pivoting movement to the interconnection crank 108, 110, to the left or to the right.

Figure 3:
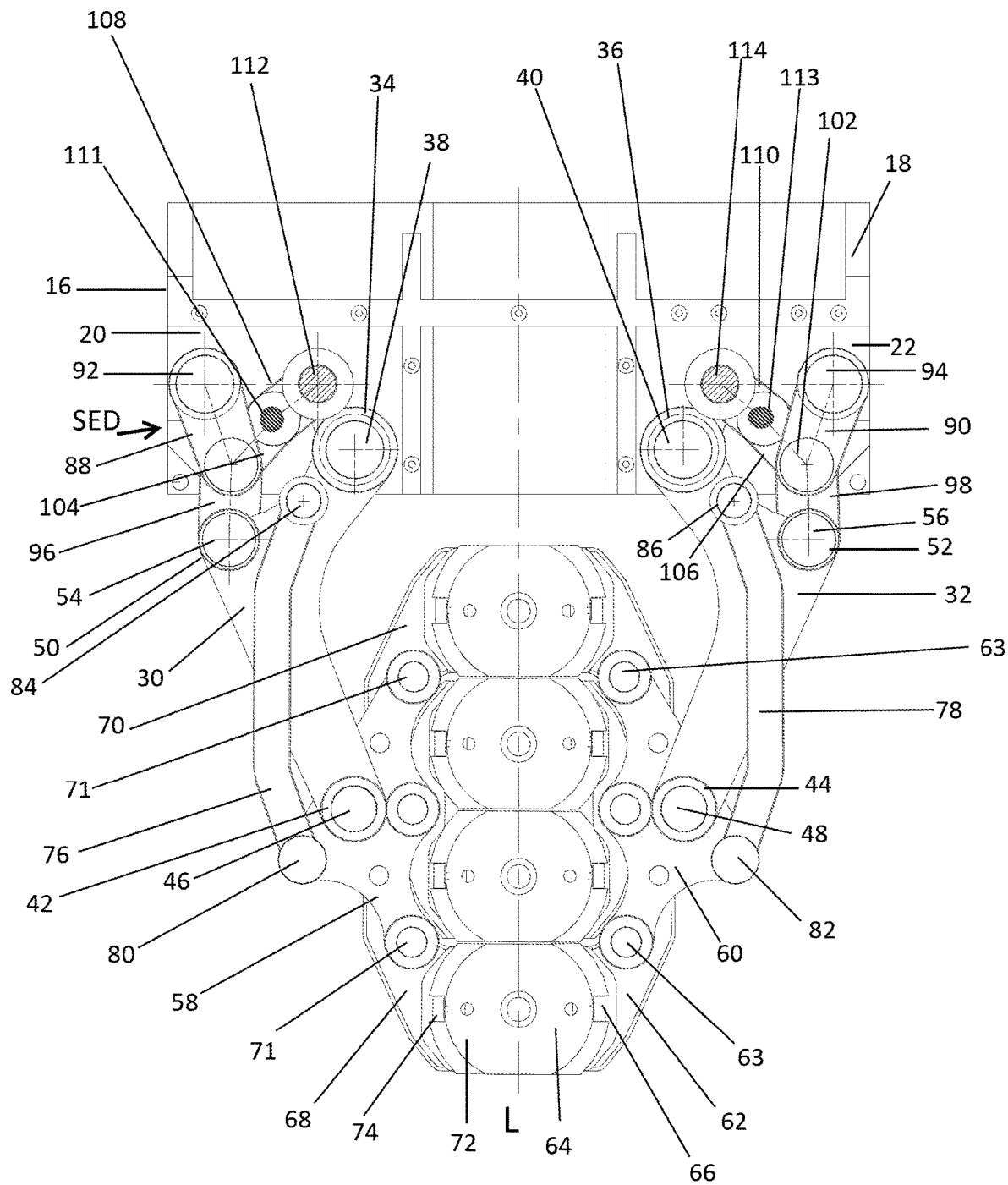

The opposite end of said secondary link is 104, 106, being connected to the interconnection crank 108, 110, by means of a vertical shaft 111, 113 (FIG. 3). The connection between the secondary link 104, 106, the interconnection crank 108, 110, in combination with the connection between the primary link 96, 98, and the articulated free link 88, 90, activating a second closing link action.

As described above, the mold opening and closing mechanism 10 includes a pair of mold support arms 30, 32, which are placed facing each other, to move the mold halves 72, 64, between a closing position and an opening position.

Once each of the parts of the mold opening and closing mechanism 10 have been described and, for a better understanding of each movement of one the parts, only the movement one of the mold support arms 30, will be described based on a polar coordinate system, which is illustrated more clearly in FIGS. 2 and 3.

As the mold support arm 30 is in the open position, output shaft 112 is rotated at a predetermined rotation angle and the interconnection crank 108, which is in a horizontal position oriented at an angle of 180°, moves in a counter-clockwise direction to an angle of approximately 225°. The movement of the interconnection crank 108 is such that the secondary link 104, located in an upward position, with an angle of approximately 90°, rotates in a clockwise direction to an angle of 45°, with the interconnection crank 108 and the secondary link 104 aligned with this movement when the mold support arm 30 and molds 72 are in their closed position.

The articulated free link 88, which is oriented downwards at an 315° angle approximately, (in the opening position of the mold support arm 30) rotates through its vertical stationary shaft 92, in the clockwise direction, until an angle of approximately 280 to 285°, at the time the mold support arm 30 remains in its closed position.

The movement of the interconnection crank 108, secondary link 104 and articulated free link 88, rotate the primary link 96, which is in an upwardly oriented position at an angle of approximately 45°, (FIG. 2) in the opposite direction to the clockwise, up to an angle of approximately 90°, and pushes the mold support arm 30 to a closed position. The mold support arm 30 rotates on the first vertical stationary shaft 38, at its first pivot point 34 and, also rotates at the second pivot point 42 at an opposite point, for moving around the second vertical shaft 46. The movement of arm 30 in turn moves the synchronization beam 58 with a movement towards the closing and opening position of molds 72.

Finally, the connecting rod 76, whose fixed pivot point is located at the bottom of the upper cover 22, is moved with a pivoting movement to the left or right by means of the retaining bolt 84. The coupling of the double linkage system SDE and the connecting rod 76 in the mold support arm 30 allows to move said mold support arm 30 with a semi-parallel movement between a closing and opening position of molds 72.

Although the movement of only one of the molds support arms 30, synchronization beam 58, connecting rod 76 and double linkage system SED system has been described, it should be understood that the set of mechanisms for moving the mold support arm 32 is a mirror arrangement of the mold support arm 30, and that the movements are the same, but in opposite direction.

As was previously described, the motor 116, 118 is programmable, so that the output shafts 112, 114, can transmit a movement to each of the mold support arms 30, 32, with variable accelerations and speeds, to perform the opening and closing movement of each one of the halves of each mold.

Since the support arms (30, 32) move independently, each arm has its own programmable motor, so that, each arm is synchronized in its opening and closing, that is, a movement profile can be programmed to each of the support arms for opening and closing movement of each of the mold halves. By means of this type of arrangement, a support arm (30 or 32) can be moved, positioning it to a virtual or theoretical zero simulating a kind of wall or stop. For example, a first movement can be generated from a zero value, from an opening position of the support arms with variable speed and positive acceleration to a maximum point, to advance the support arms and molds into a closing position, in a position facing each other; generating a second movement from the maximum point with speed and negative acceleration until it stopping at a central line (L) of the mold closure matching the union of each mold half; and, once the glassware forming process has been completed in the molds, generating a third movement with variable speed and positive acceleration and negative acceleration for the opening of the molds and support arms until the opening position of the support arms is reached.

Additionally, the mold opening and closing can be programmed by moving a first support arm, for example, the support arm 30, in a time T1 and a positioning force F1, (for example, a closing force of 2000 lbs. force), to a position of line of partition of molds, i.e. to a mold parting line position, until it stops at the center or virtual line (L) coinciding with the joint of each mold half; moving the second support arm (32) with a time lag $T_{n-1}$, (for example with a time lag of one or two hundredths of a second) and a positioning force equal to or less than F2, until the central parting line of each half of each mold is reached. This type of lag is feasible through the definition of a movement profile for each arm, with variables accelerations and speeds.

Once the support arms (30, 32) have been closed, these are locked in the closed position of the support arms and mold halves, reducing the closing force of the molds during the forming of the article. Once the glassware forming has been completed in the molds, the support arms and mold halves are unlocked and open simultaneously to avoid defects in the glassware due to vacuum or capillary forces.

As can be seen from the foregoing, a mechanism for opening and closing molds for the manufacture of hollow glass articles has been described and it will be evident to those skilled in the art that many other features or improvements could be made, which they may be considered within the field determined by the following claims.

I claim:

1. A mold opening and closing mechanism for a glassware forming machine that includes at least one mold divided into two halves that open and close for forming glassware, said mold opening and closing mechanism includes:
    a support structure;
    a pair of support arms, each being independently mounted opposite one another on the support structure, each support arm having a first end mounted for movement around a first pivot point on a first vertical shaft that is mounted on the support structure for rotating the first end of the support arms at the first pivot point and a second end, for moving the arms to a closing or opening position, said second end of the support arms including a second pivot point for moving around a second vertical shaft; and, a third pivot point for moving around a third pivot shaft;
    mold synchronization beams, such synchronization beams being mounted for movement at said second pivot point of the support arms, such mold synchronization beams being mounted for moving with an inward or outward movement for opening and closing the at least one mold;
    connecting rods having a first end articulately connected to the mold synchronization beams to provide an articulated movement to the mold synchronization beams; and, a second end connected to the support structure for pivoting at a fixed point, such pair of connecting rods and such pair of support arms transmitting an articulated inward or outward movement to such mold synchronization beams for closing or opening the molds;
    drive means coupled to the support structure, each of said drive means having an output shaft, said drive means providing a rotational movement to each of the output shafts causing the output shafts to rotate to the left or to the right; and,
    a linkage system which is articulately and separately connected by each of the support arms and to the output shaft of the drive means, wherein, by means of a first rotating movement of the output shaft of the drive means, the support arms, the connecting rods and mold synchronization beams are moved to a mold closing position and, with a second movement, in an opposite direction, each of the mold support arms, connecting rods, synchronization beams and each of the mold halves are opened to an opening position.

2. The mold opening and closing mechanism for a glassware forming machine as claimed in claim 1, wherein synchronization beams include self-balancing mold holders coupled to a front part of the synchronization beams to retain each of the mold halves of the molds, wherein said self-balancing mold holders provide a same closing force to each of said molds.

3. The mold opening and closing mechanism for a glassware forming machine as claimed in claim 1, where the drive means is a programmable motor.

4. The mold opening and closing mechanism for a glassware forming machine as claimed in claim 1, wherein the linkage system includes:
    an interconnection crank coupled at one end to an upper part of the output shaft, which rotates together with the output shaft of the drive means at a predetermined angle of rotation to the left or right;
    a first link having a first end connected to a vertical stationary axis to rotate at a fixed pivot point on the support structure; and, a second end to rotate freely to a right or left side;
    a second link having a first end connected, at said third pivot point of the support arms, to pivot on the vertical axis with a pivoting movement to the right or left side; and, a second end connected to rotate to the right or left side; and,
    a third link having a first end and a second end, said first end of the third link being connected jointly and articulately with the second end of the first rotating link and the second end of the second link to have a pivoting movement to the left or to the right; and, the second end of the third link being connected to the interconnecting crank, such drive means providing a rotational movement to the interconnection crank to provide a closing or opening movement to the mold support arms, mold synchronization beams and connecting rods, for the opening and closing of each of the support arms and each of the mold halves of the molds.

5. The mold opening and closing mechanism for a glassware forming machine as claimed in claim 1, wherein the support arms are positioned for allowing the opening and closing of the arms with a curvilinear translation movement.

6. The mold opening and closing mechanism for a glassware forming machine as claimed in claim 1, where linkage system is a double linkage system which, with a first movement, in the mold closing position, locks and immobilizes the opening and closing mechanism of the molds and, with a second movement, unlocking or releasing the mold opening and closing mechanism for the opening of each of the support arms and mold halves.

7. The mold opening and closing mechanism for a glass forming machine as claimed in claim 1, including a programmable motor for programming the opening and closing movement of each of the support arms and mold halves according to a predetermined profile.

8. A mold opening and closing method for a glassware forming machine that includes at least one mold divided into two halves that open and close to form articles, the method comprising the steps of:
    providing a support structure;
    providing a pair of support arms each being mounted separately facing each other and spaced apart in parallel to the support structure, each support arm having a first end mounted for moving around a first pivot point, in a first vertical shaft which is mounted on the support structure, at the first pivot point, to rotate a first end of the support arms and a second end, to move the arms towards a closing or opening position, said second end of the support arms including a second pivot point for movement around a second vertical shaft; and, a third pivot point for movement around a third pivot shaft;

providing a pair of mold synchronization beams, each of such mold synchronization beams being mounted for movement at said second pivot point of the mold support arms, such mold synchronization beams being mounted for moving with an inward or outward movement for opening and closing the mold;

providing a pair of connecting rods, each of said connecting rods having a first end articulately connected to the synchronization beams to provide an articulated movement to such synchronization beams; and, a second end being connected to the support structure to a fifth pivot point, at a fixed point, such connecting rods and said pair of support arms capable of transmitting an articulated inward or outward movement to said synchronization means, for the closing or opening of the molds;

providing drive means coupled to the support structure, each of said drive means having an output shaft, said drive means providing a rotational movement to each output shaft causing each output shaft to rotate to the left or right;

providing a double linkage system which is connected articulately and independently by each support arms and the output shaft of the drive means, wherein, by means of a first rotational movement of the output shaft, the support arms and synchronization means are moved to a mold closing position and, with a second movement, in the opposite direction, each mold support arms, synchronization means and each of the mold halves open;

generating an independent rotational movement for each output shaft through the drive means to carry out a closing movement of the support arms and synchronization means, and to lock and immobilize a mechanism for opening and closing the mold in the closed position of the support arms and mold halves;

carrying out a glass article forming process in each of the molds; and, providing, once the glass article forming process has been finished, a second independent rotational movement to each shaft, said second rotational movement being in the opposite direction to the first rotational movement to unlock and open the mold support mechanism and to carry out an opening movement of the support arms, the synchronization beams and each of the mold halves.

9. The mold opening and closing method, as claimed in claim 8, wherein the opening movement and/or closing movement of the support arms includes the step of: generating a movement profile for each support arm for the opening and closing of each mold halves.

10. The mold opening and closing method, as claimed in claim 9, wherein the movement profile of the support arms comprises a first movement, a second movement, and a third movement and wherein the method of generating the movement profile comprises:

generating a first movement from a zero value from an opening position of the support arms with variable speed and positive acceleration until reaching a maximum point to move the support arms and molds to a closed position, in a position opposite one another;

generating a second movement from the maximum point with variable speed and with negative acceleration until stopping with a zero value, in a central line of closure of molds, coinciding with a union of each mold half; and, generating a third movement with variable speed and positive and negative acceleration for the mold and support arm opening, until reaching the opening position of the support arms.

11. The mold opening and closing method, as claimed in claim 10, including the steps of:

moving a first support arm with a time $T_1$ and a positioning force $F_1$ toward a mold parting line position until stopping at a location adjacent to a central line coinciding with the union of each mold half;

moving a second support arm with a time lag $T_{n-1}$ and a positioning force equal to or less than $F_2$ until a position of a central parting line of each of the halves of each mold is reached;

locking the support arms in the closed position of the support arms and mold halves, to reduce a closing force of the molds during forming of the article; and, simultaneously opening the support arms and mold halves to avoid defects in the article due to vacuum or capillary forces.

* * * * *